(12) United States Patent
Murata

(10) Patent No.: US 12,717,149 B2
(45) Date of Patent: Aug. 25, 2026

(54) HEAD-MOUNTED DISPLAY

(71) Applicant: Sony Interactive Entertainment Inc., Tokyo (JP)

(72) Inventor: Kazuyoshi Murata, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 0 days.

(21) Appl. No.: 18/704,564

(22) PCT Filed: Nov. 8, 2021

(86) PCT No.: PCT/JP2021/041019
§ 371 (c)(1),
(2) Date: Apr. 25, 2024

(87) PCT Pub. No.: WO2023/079748
PCT Pub. Date: May 11, 2023

(65) Prior Publication Data

US 2025/0244590 A1 Jul. 31, 2025

(51) Int. Cl.
*G02B 27/01* (2006.01)

(52) U.S. Cl.
CPC ..... *G02B 27/0176* (2013.01); *G02B 27/0172* (2013.01)

(58) Field of Classification Search
None
See application file for complete search history.

(56) References Cited

U.S. PATENT DOCUMENTS 5,986,813 A * 11/1999 Saikawa .............. G02B 27/017 359/630
9,703,103 B2 7/2017 Araki
10,477,711 B2 11/2019 Araki
11,360,545 B2 6/2022 Takahashi
11,687,159 B2 6/2023 Sakamoto
11,887,281 B2 1/2024 Ikenoue
2016/0062454 A1* 3/2016 Wang ................ G02B 27/0172 345/633

(Continued)

FOREIGN PATENT DOCUMENTS

CN 105866954 A 8/2016
CN 206532035 U 9/2017

(Continued)

OTHER PUBLICATIONS

International Search Report for corresponding PCT Application No. PCT/JP2021/041019, 4 pages, dated Jan. 25, 2022.

(Continued)

*Primary Examiner* — Dorothy Harris
(74) *Attorney, Agent, or Firm* — Kilpatrick Townsend & Stockton LLP

(57) ABSTRACT

Provided is a head-mounted display that is able to provide a user with a greater sense of presence. The head-mounted display (1) includes a main body (10), a front support section (21), a housing section (34*c*), and a vibration motor (40). The main body (10) has a display panel (11). The front support section (21) is connected to the upper side of the main body (10) and placed on the forehead of the user. The housing section (34*c*) is disposed on the front support section (21). The vibration motor (40) is accommodated in the housing section (34*c*).

18 Claims, 7 Drawing Sheets

(56) References Cited

U.S. PATENT DOCUMENTS

| | | | | |
|---|---|---|---|---|
| 2016/0171846 | A1* | 6/2016 | Brav | G08B 6/00 340/407.1 |
| 2017/0017085 | A1 | 1/2017 | Araki | |
| 2017/0082859 | A1* | 3/2017 | Drinkwater | G02B 27/0176 |
| 2017/0153672 | A1* | 6/2017 | Shin | H04M 1/724097 |
| 2018/0027676 | A1 | 1/2018 | Araki | |
| 2019/0204606 | A1* | 7/2019 | Yang | H04R 5/0335 |
| 2020/0033601 | A1* | 1/2020 | Magrath | G06F 3/011 |
| 2020/0124860 | A1* | 4/2020 | Gwak | G02B 27/0176 |
| 2021/0097285 | A1* | 4/2021 | Lee | G06F 3/011 |
| 2021/0191504 | A1 | 6/2021 | Takahashi | |
| 2021/0389822 | A1* | 12/2021 | Sakamoto | G06F 3/016 |
| 2022/0277425 | A1 | 9/2022 | Ikenoue | |
| 2023/0280834 | A1 | 9/2023 | Sakamoto | |

FOREIGN PATENT DOCUMENTS

| | | | | |
|---|---|---|---|---|
| EP | 3876524 | A1 | 9/2021 | |
| JP | 1065996 | A | 3/1998 | |
| JP | 2000235164 | A | 8/2000 | |
| JP | 2003125313 | A | 4/2003 | |
| JP | 2014119786 | A | 6/2014 | |
| JP | 2017182130 | A | 10/2017 | |
| JP | 2020526065 | A | 8/2020 | |
| JP | 2021007254 | A | 1/2021 | |
| JP | 2021067877 | A | 4/2021 | |
| WO | 2015137165 | A1 | 9/2015 | |
| WO | 2016136657 | A1 | 9/2016 | |
| WO | WO-2020090477 | A1 * | 5/2020 | H04N 13/117 |

OTHER PUBLICATIONS

Notification of Reasons for Refusal for corresponding JP Application No. 2023-557592, 23 pages, dated Feb. 5, 2025.

EP21963341.9, “Extended European Search Report”, Jun. 25, 2025, 7 pages.

JP2023-557592, “Notice of Decision to Grant”, Jul. 8, 2025, 3 pages.

JP2023-557592, “Office Action”, Apr. 30, 2025, 3 pages.

* cited by examiner 37
37a
37b
37c
40
41
42
43
36
36a
36c
36c
36d
36e
36f
36g
X1
X2
Y1
Y2
Z1
Z2

HEAD-MOUNTED DISPLAY

TECHNICAL FIELD

The present disclosure relates to a head-mounted display.

BACKGROUND ART

Head-mounted displays are used to present moving images such as game videos and movies. When a head-mounted display is used, a moving image spreads out in front of eyes of a user with external light blocked. Therefore, the user is given a highly immersive feeling.

CITATION LIST

Patent Literature

[PTL 1] PCT Patent Publication No. WO2015/137165
[PTL 2] PCT Patent Publication No. WO2016/136657
[PTL 3] PCT Patent Publication No. WO2020/090477

SUMMARY

Technical Problem

It is demanded that a greater sense of presence be provided by using a head-mounted display.

Solution to Problem

A head-mounted display proposed in the present disclosure includes a main body, a front support section, a housing, and a vibration motor. The main body has a display panel. The front support section is connected to the upper side of the main body and placed on a forehead of a user. The housing is disposed on the front support section. The vibration motor is accommodated in the housing. This head-mounted display enables the vibration motor to provide a greater sense of presence. Further, since the vibration motor is accommodated in the housing, the vibration motor can be stably driven.

DESCRIPTION OF EMBODIMENT

A head-mounted display proposed in the present disclosure will now be described with reference to the accompanying drawings. In the following description, Y1 and Y2 depicted in FIG. 1 indicate a forward direction and a rearward direction, respectively, X1 and X2 depicted in FIG.

Figure 1:
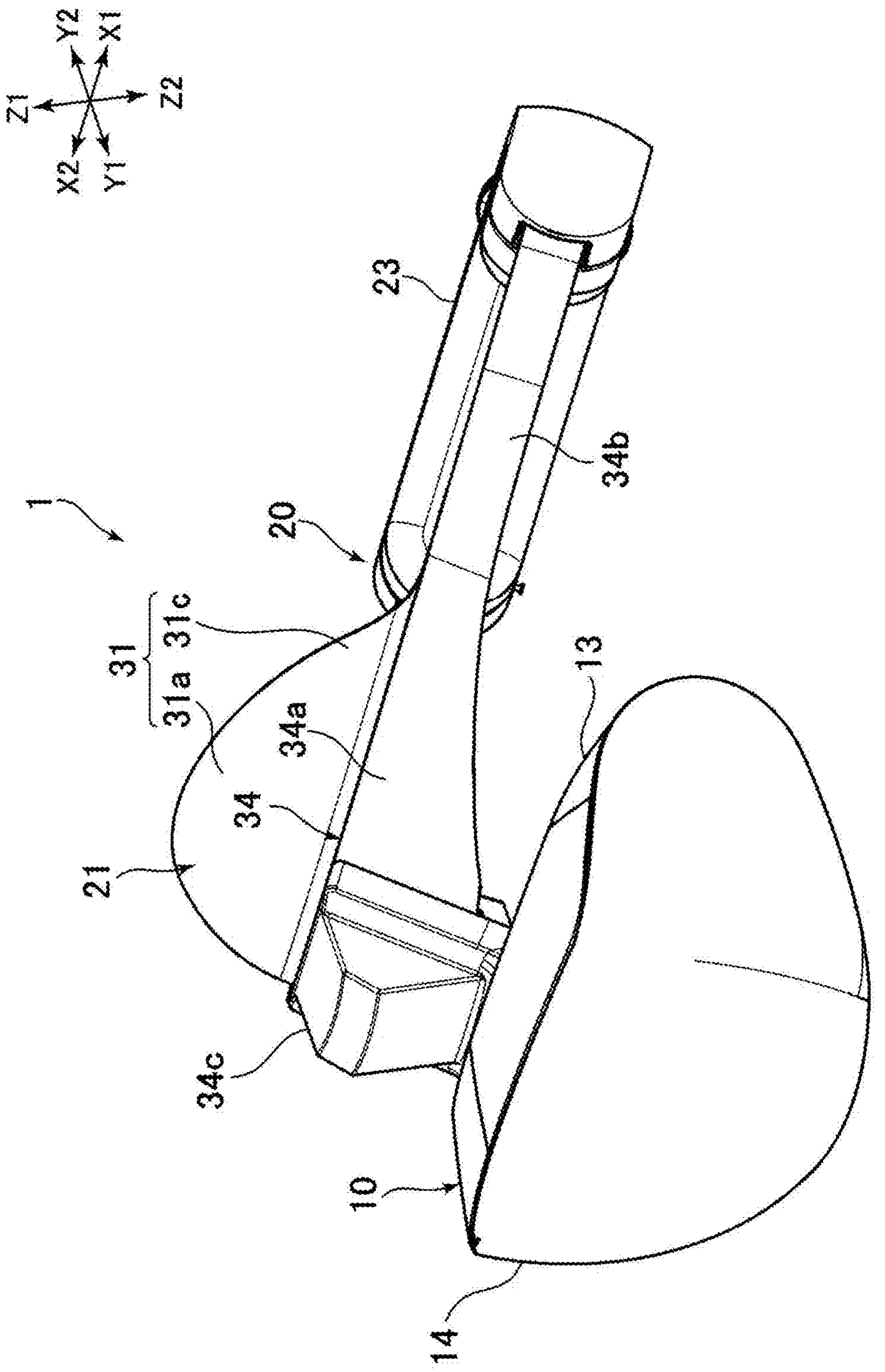
FIG. 1 is a perspective view illustrating an example of a head-mounted display proposed in the present disclosure.

1 indicate a rightward direction and a leftward direction, respectively, and Z1 and Z2 depicted in FIG. 1 indicate an upward direction and a downward direction, respectively. Further, in the following description, the head-mounted display is referred to as the HMD.

The HMD 1 is connected in a wired or wireless manner, for example, to an external information processing device. The information processing device is, for example, a gaming device or an audio-visual device. The information processing device may be a device connected to the HMD 1 through a wired or wireless local area network (LAN), or a server device connected to the HMD 1 through the Internet. The information processing device functioning as a gaming device performs a process related to a game and transmits game videos to the HMD 1 through a wired or wireless LAN and/or the Internet. The audio-visual device reproduces video content stored in a storage device and transmits reproduced content data to the HMD 1 through a wired or wireless LAN and/or the Internet. Alternatively, the HMD 1 may include an information processing device built in a main body 10 (see FIG. 1) that functions as the above-mentioned gaming device.

Figure 2:
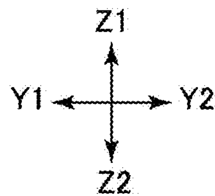
FIG. 2 is a side view of the head-mounted display depicted in FIG. 1.
Figure 2:
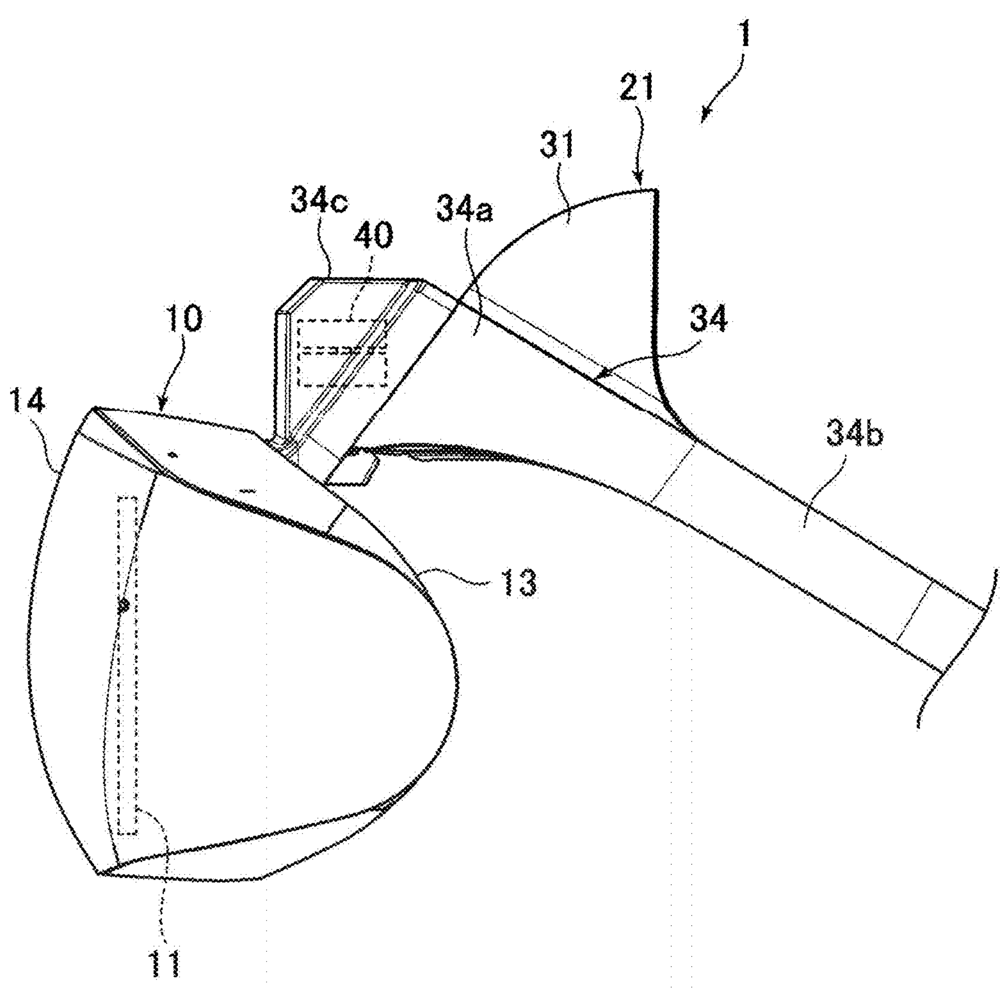

The main body 10 of the HMD 1 includes a display panel 11 (see FIG. 2). As the display panel 11, for example, a liquid crystal display panel or an organic electro luminescence (EL) display panel can be used. The main body 10 has a main body housing 14. The display panel 11 is accommodated in the main body housing 14. A light blocking cushion 13 (see FIG. 1) is attached to a rear edge of the main body housing 14. The light blocking cushion 13 is formed so as to surround the display panel 11. The light blocking cushion 13 prevents external light from reaching eyes of a user when the HMD 1 is worn by the user.

As depicted in FIG. 1, the HMD 1 has a mounting band 20. For the whole, the mounting band 20 is shaped so as to surround a head of the user. That is, the mounting band 20 is annular in plan view. The mounting band 20 has a front support section 21 that is disposed on the front thereof and placed on the forehead of the user. The front support section 21 is connected to the upper side of the main body 10.

As depicted in FIG. 1, the mounting band 20 has a rear support section 23 on its rear part. The mounting band 20 has two extended sections **34*b* that are extended rearward from the front support section 21. The two extended sections 34*b* are extended rearward from the right and left portions of the front support section 21, respectively. The rear support section 23 is connected to rear parts of the left and right extended sections 34*b*. When the HMD 1 is used, the front support section 21 and the rear support section 23 sandwich the user's head in a front-rear direction. A length of the mounting band 20 is adjusted by moving the rear support section 23 in the front-rear direction. That is, when the rear support section 23 is moved forward with respect to the extended sections 34*b*, a size of the mounting band 20 decreases. When the rear support section 23 is moved rearward with respect to the two extended sections 34*b*, the size of the mounting band 20** increases.

The mounting band 20 may include an elastic member for pressing the rear support section 23 forward. For example, the rear parts of the left and right extended sections **34*b* may be inserted into the rear support section 23. The rear support section 23 may accommodate a spring that pulls the rear parts of the left and right extended sections 34*b* and may be pressed forward by elastic force of the spring. Alternatively, however, the extended sections 34*b* may be formed by rubber so as to press the rear support section 23** forward.

As depicted in FIG. 2, the HMD 1 includes a vibration motor 40. The vibration motor 40 is driven (vibrated) in accordance with an instruction received from an information processing device (e.g., a gaming device) disposed outside or included in the HMD 1. For example, when an object or a game character operated by the user is shocked, the vibration motor vibrates. This increases sense of presence in a game.

Figure 3:
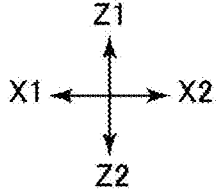
FIG. 3 is a front view of the head-mounted display depicted in FIG. 1.
Figure 3:
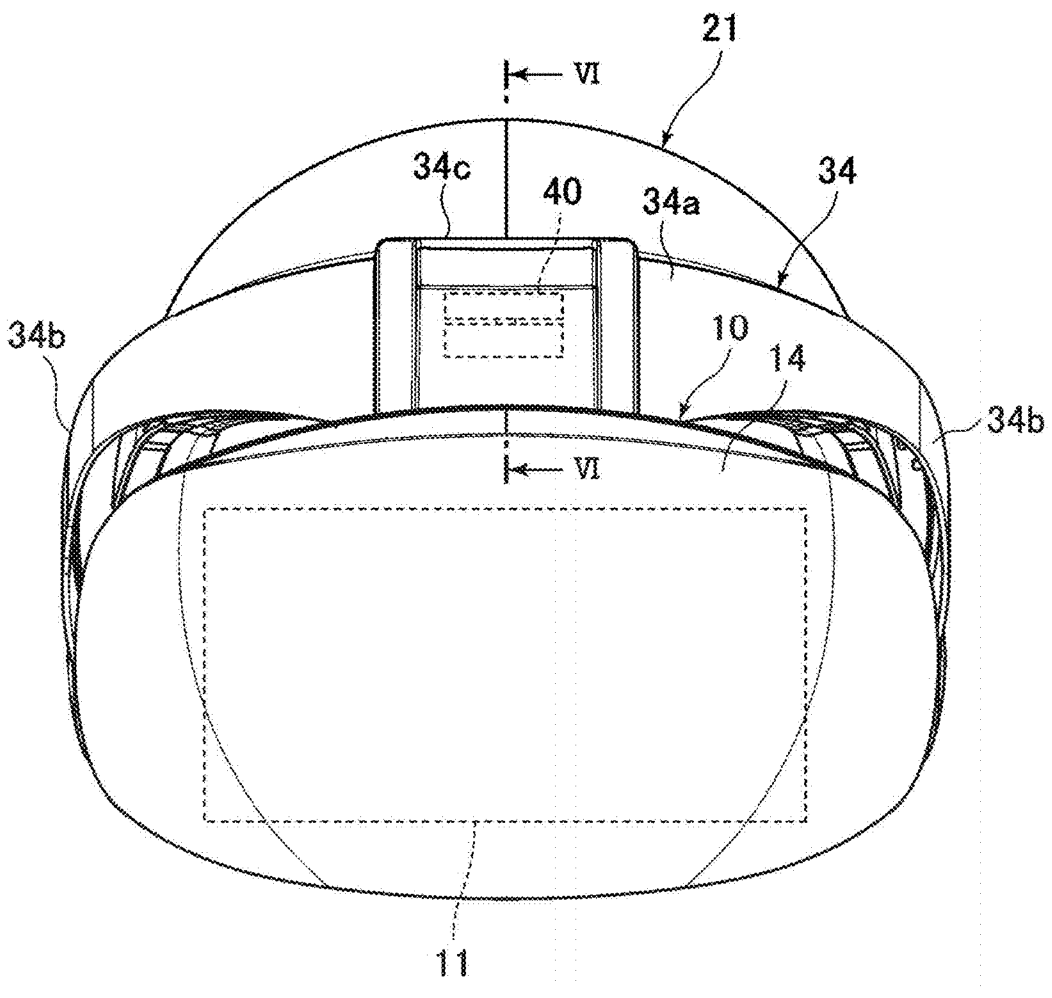

The vibration motor 40 is disposed in the front support section 21. The vibration motor 40 is positioned at a center of the front support section 21 in a left-right direction. Further, the vibration motor 40 is positioned in a lower part of the front support section 21 when the HMD 1 is viewed from the front (see FIG. 3). As depicted in FIG. 1, the mounting band 20 has a band frame 34. The band frame 34 has a housing section 34*c* that accommodates the vibration motor 40. The housing section 34*c* inhibits the vibration motor 40 from being exposed to the outside.

The vibration motor 40 is preferably disposed in such a manner that it vibrates in a direction intersecting an up-down direction of the display panel 11. More specifically, the vibration motor 40 is preferably disposed in such a manner that it vibrates in a direction substantially orthogonal to the up-down direction of the display panel 11. Disposing the vibration motor 40 in the above manner makes it possible to inhibit the display panel 11 from shaking in the up-down direction and becoming difficult to see when the vibration motor 40 vibrates.

Figure 6:
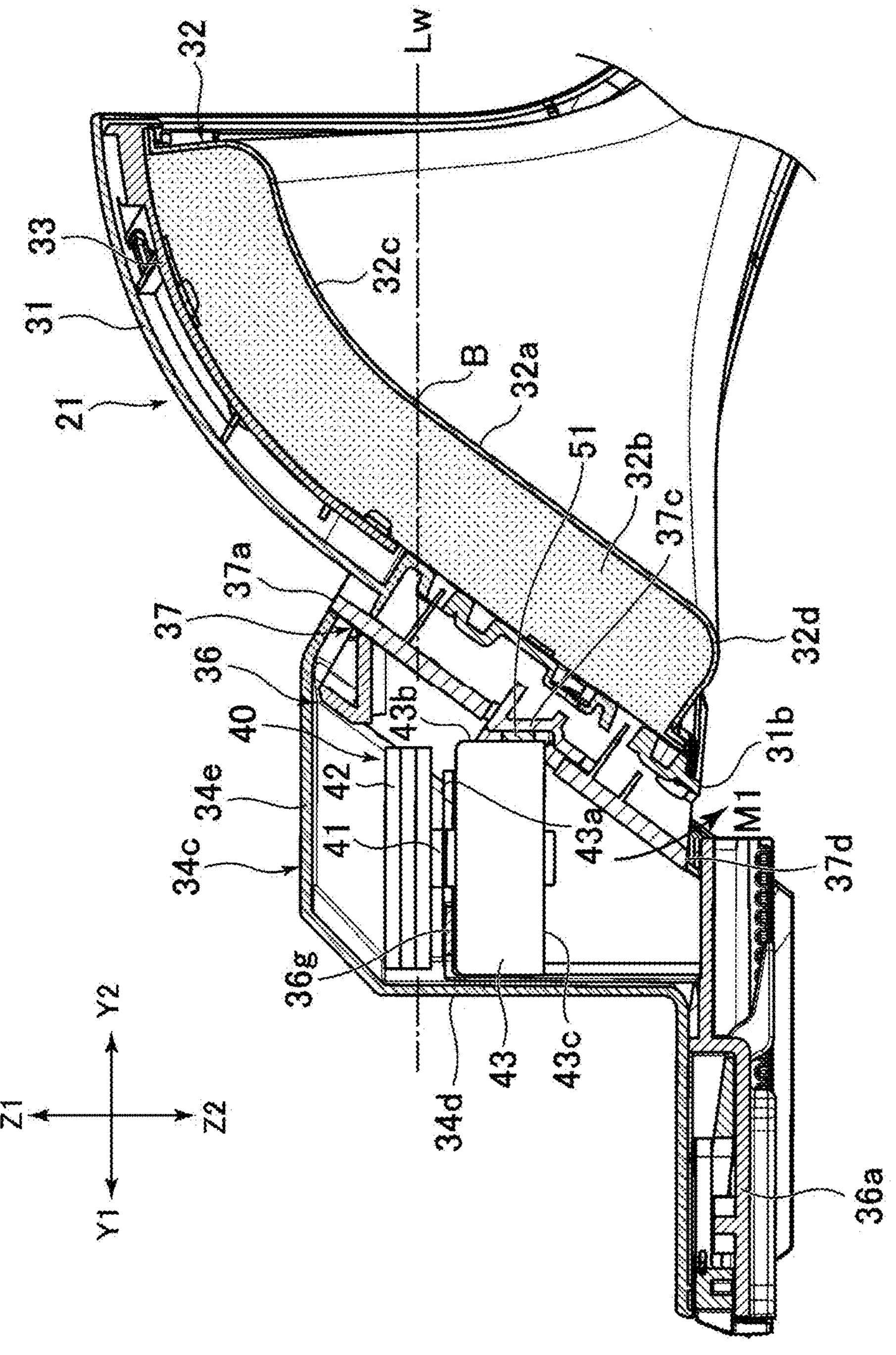
FIG. 6 is a cross-sectional view taken along line VI-VI in FIG. 3.

The vibration motor 40 may be, for example, an eccentric motor. More specifically, as depicted in FIG. 6, the vibration motor 40 may include a rotating shaft 41 and a weight 42 that is attached to the rotating shaft 41 and has a center of gravity at a position away from the rotating shaft 41. Vibration of the vibration motor 40 occurs in a direction perpendicular to the rotating shaft 41. The rotating shaft 41 may be oriented in a direction along the display panel 11. That is, the rotating shaft 41 may be disposed in a direction substantially parallel to the display panel 11. More specifically, the rotating shaft 41 is disposed to face in the up-down direction of the display panel 11. Since the rotating shaft 41 is disposed as described above, the vibration of the vibration motor 40 is generated in a direction substantially orthogonal to the up-down direction of the display panel 11. This makes it possible to inhibit the display panel 11 from shaking up and down and becoming difficult to see due to the vibration of the vibration motor 40.

The vibration motor 40 may be a voice coil motor. The voice coil motor may be disposed in such a manner that it vibrates in a direction perpendicular to the display panel 11. Alternatively, the voice coil motor may be disposed in such a manner that it vibrates in the left-right direction of the display panel 11. Disposing the voice coil motor in the above manner makes it possible to inhibit the display panel 11 from shaking in the up-down direction and becoming difficult to see when the voice coil motor vibrates.

As depicted in FIG. 1, the front support section 21 has a main frame 31. The main frame 31 is formed by resin such as plastic. The main frame 31 may be curved so as to fit the shape of the user's head. More specifically, the main frame 31 may have a center section 31*a* and left and right side sections 31*c* that are positioned on the right and left sides of the center section 31*a*. The center section 31*a* and the side section 31*c* may be curved so as to surround the user's forehead.

As depicted in FIG. 6, the front support section 21 has a cushion 32. The cushion 32 has an inner surface (rear surface) 32*a* for contacting the user's forehead. As is the case with the main frame 31, the cushion 32 may also be curved so as to surround the forehead. The cushion 32 is formed, for example, by sponge, but may alternatively be formed by elastomer. The front support section 21 may have a cushion frame 33 to which the cushion 32 is attached. The cushion frame 33 may be attached to the inside (rear side) of the main frame 31, and the cushion 32 may be attached to the inside (rear side) of the cushion frame 33.

Figure 4:
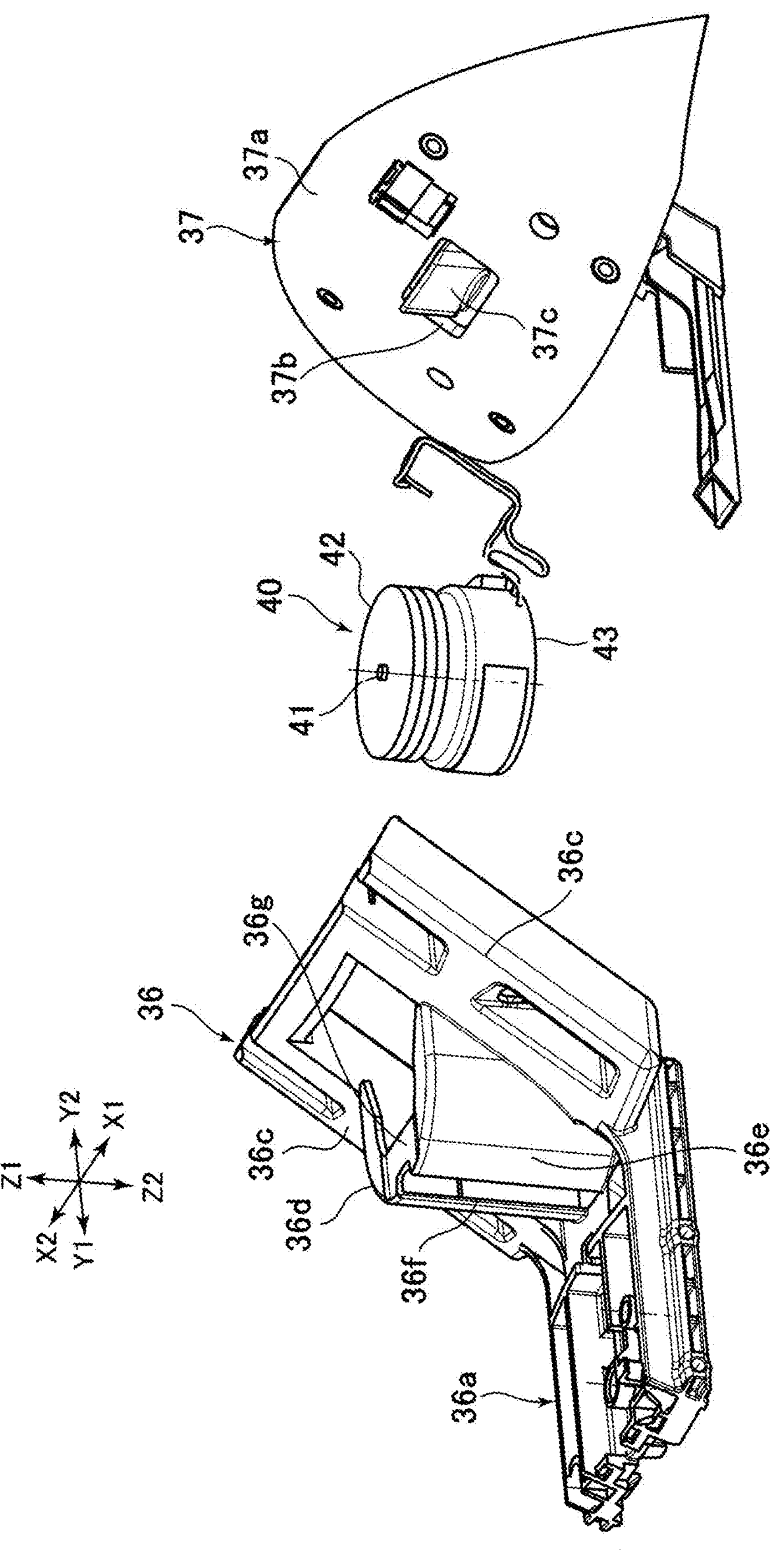
FIG. 4 is an exploded perspective view of a frame that forms a front support section of the head-mounted display.
Figure 5:
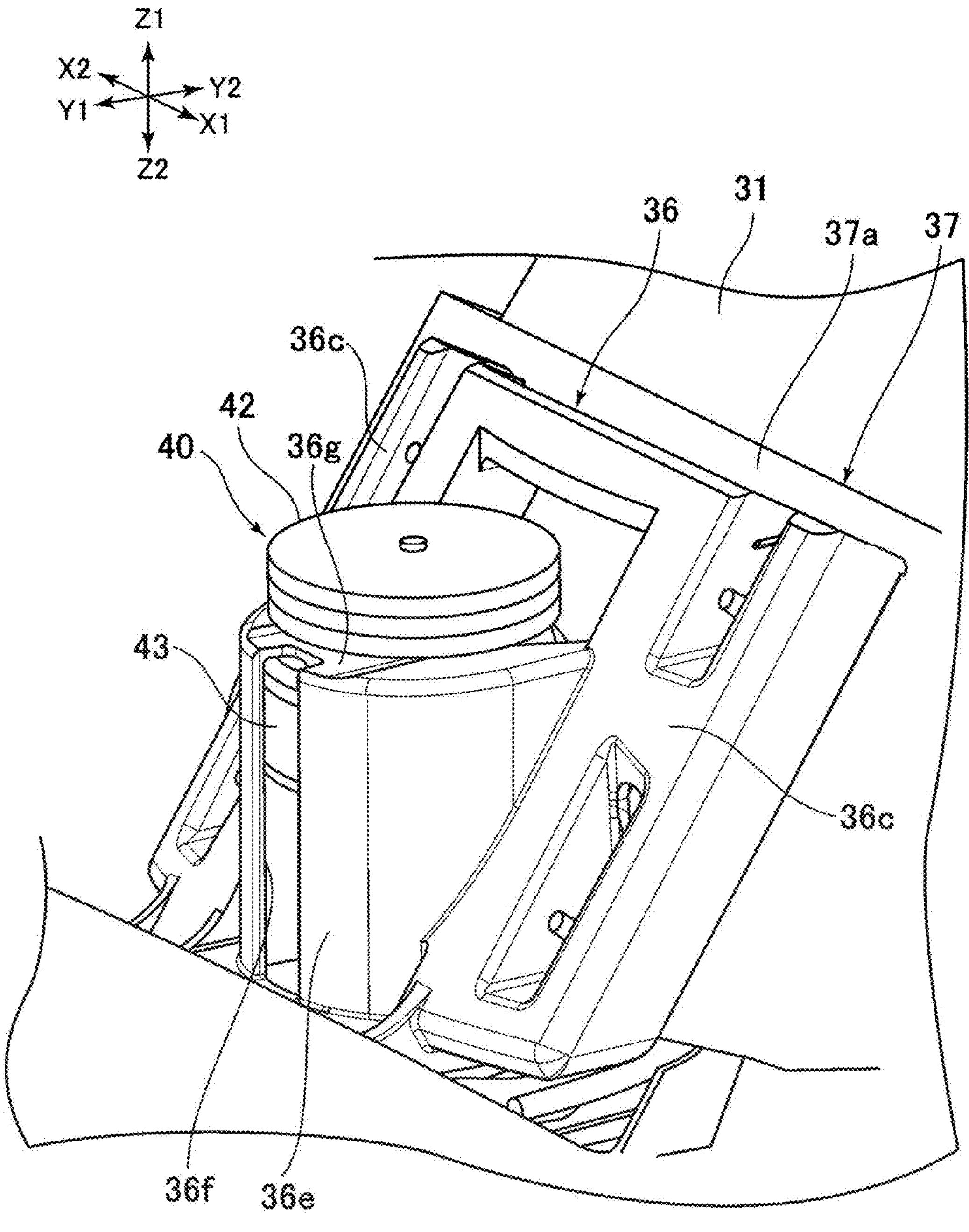
FIG. 5 is a perspective view illustrating a state where a band frame depicted in FIG. 1 is removed.

As depicted in FIGS. 4 and 5, the front support section 21 has motor frames 36 and 37 that support the vibration motor 40. The motor frames 36 and 37 are combined, for example, in the front-rear direction. The vibration motor 40 may be disposed between these two motor frames 36 and 37.

The motor frame 36 is attached to the front side of the motor frame 37. For example, screws or other fasteners may be used to attach the motor frames 36 and 37 to each other. Alternatively, a claw may be formed on one of the motor frames, and allowed to catch the other motor frame in order to fix the two motor frames 36 and 37 to each other.

As depicted in FIG. 4, the motor frame 36, which is positioned on the front side, has a main body support section 36*a* in its lower part. An upper part of the main body 10 is coupled to the main body support section 36*a*. For example, a frame (not depicted) included in the main body 10 is coupled to the main body support section 36*a*. Since the structure for supporting the main body 10 and the structure for supporting the vibration motor 40 are formed by a common member (i.e., the motor frame 36) as described above, the number of parts can be reduced. Further, the vibration of the vibration motor 40 can be effectively transmitted to the main body 10 as well through the motor frame 36. This makes it possible to provide the user with a great sense of presence.

The motor frame 36 has a pillar section 36*c* in its upper part. The pillar section 36*c* is to be attached to the motor frame 37. The main body support section 36*a* is extended forward from the lower part of the pillar section 36*c*. The main body 10 may be movable in the front-rear direction along the main body support section 36*a*. When the main body 10 is movable as described above, the relative position between the user's eyes and the display panel 11 can be adjusted.

Figure 7:
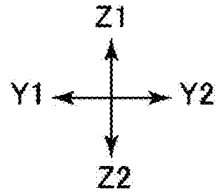
FIG. 7 is a side view illustrating a state where the band frame depicted in FIG. 1 is removed.
Figure 7:
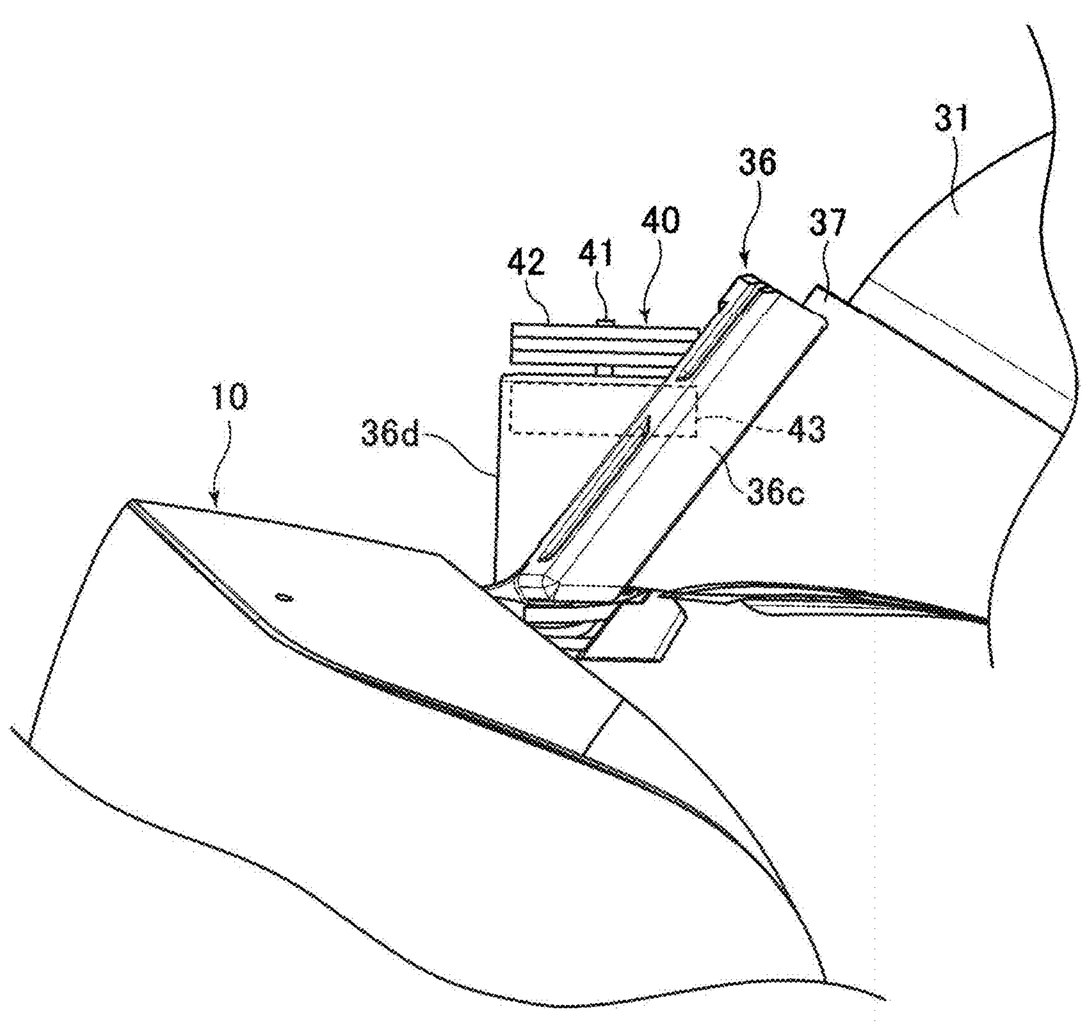

As depicted in FIG. 4, the motor frame 36 may have left and right pillar sections 36*c*. Further, the vibration motor 40 may be disposed between the left and right pillar sections 36*c*. As depicted in FIG. 7, the vibration motor 40 overlaps the pillar section 36*c* in a side view of the HMD 1. The vibration motor 40 has a motor main body 43 that supports the rotating shaft 41. The motor main body 43 has a coil and a magnet. The pillar section 36*c* may overlap the rear part of the motor main body 43. Since the motor frame 36 and the vibration motor 40 are disposed in the above manner, the widths of the motor frames 36 and 37 and vibration motor 40 in the front-rear direction can be reduced compared to, for example, a structure in which the vibration motor 40 is entirely positioned in front of the pillar section 36*c*. This makes it possible to reduce the forward bulge of the housing section 34*c* accommodating the vibration motor 40.

As depicted in FIGS. 4 and 5, the motor frame 36 may have a recess section 36*d* that is formed between the left and right pillar sections 36*c*. The motor main body 43 may be disposed inside the recess section 36*d* and retained by the recess section 36*d*. The weight 42 may be exposed above the recess section 36*d*.

As depicted in FIGS. 4 and 5, the recess section 36*d* may have a front support wall 36*e* that is formed so as to surround the motor main body 43, which is cylindrical in shape. An opening 36*f* that exposes the front side of the motor main body 43 may be formed in the front support wall 36*e*. Since the recess section 36*d* is structured as described above, the widths of the motor frame 36 and vibration motor 40 in the front-rear direction can be reduced by the thickness of the front support wall 36*e*. As a result, the forward bulge of the housing section 34*c* accommodating the vibration motor 40 can be reduced. The recess section 36*d* has an upper wall 36*g* that is positioned above the motor main body 43.

As depicted in FIG. 6, the motor frame 37, which is positioned on the rear side, may be attached, for example, to the main frame 31. When the motor frame 37 is attached to the main frame 31, the vibration of the vibration motor 40 can be transmitted to the user's forehead through the motor frame 37, the main frame 31, and the cushion 32, so that a great sense of presence can be provided to the user.

For example, screws or other fasteners may be used to attach the main frame 31 and the motor frame 37 to each other. Alternatively, a claw may be formed on one of these frames and allowed to catch the other frame. The structures of the frames are not limited to examples depicted in FIG. 6. An alternative is, for instance, to adopt a member that is formed by integrating the main frame 31 with the motor frame 37, which is positioned on the rear side.

As depicted in FIG. 4, the motor frame 37 has a wall section 37*a* and a recess section 37*b*. The wall section 37*a* is disposed along the front side of the main frame 31. The recess section 37*b* is formed on the wall section 37*a*. A part (rear part) of the motor main body 43 may be fitted inside the recess section 37*b*. When such a structure is adopted, the vibration motor 40 can be disposed closer to the rear (closer to the user's head) than when, for example, the adopted structure is such that the motor main body 43 is disposed on the front side of the wall section 37*a* where the recess section 37*b* is not formed. This makes it possible to reduce a moment caused by a weight of the vibration motor 40 when, for example, the user moves his or her head. Further, the forward bulge of the housing section 34*c* for accommodating the vibration motor 40 can be reduced.

As depicted in FIG. 4, the motor frame 37 may have a rear support wall 37*c* that is formed inside the recess section 37*b*. The rear support wall 37*c* supports the rear side of the motor main body 43. An elastic body 51 (see FIG. 6) formed, for example, by rubber or elastomer may be disposed between the rear support wall 37*c* and the motor main body 43. When the elastic body 51 is disposed as described above, it is possible to suppress noise caused by the collision between the motor main body 43 and the rear support wall 37*c*.

The rear support wall 37*c* may function as a leaf spring that presses the motor main body 43 forward. This makes it possible to suppress the rattling of the vibration motor 40 inside the recess section 36*d* (see FIG. 4) formed on the motor frame 36, which is positioned on the front side.

It should be noted that an elastic body formed, for example, by rubber or elastomer, may also be disposed inside the front support wall 36*e* (see FIG. 4) of the motor frame 36. When the elastic body is disposed as described above, it is possible to suppress noise caused by the collision between the motor main body 43 and the front support wall 36*e*.

As described above, in the front support section 21 of the mounting band 20, the recess sections 36*d* and 37*b* are respectively formed on the two motor frames 36 and 37, which are combined in the front-rear direction. The front part of the motor main body 43 is disposed in the recess section 36*d* of the motor frame 36, which is positioned on the front side, and the rear part of the motor main body 43 is disposed in the recess section 37*b* of the motor frame 37, which is positioned on the rear side. Unlike the example described here, a recess section for accommodating a part of the motor main body 43 may be formed on only one of the two motor frames 36 and 37 without forming such a recess section in the other motor frame.

As depicted in FIG. 6, the vibration motor 40 is positioned in front of a lower part 32*b* of the cushion 32. Therefore, the vibration of the vibration motor 40 can be transmitted to the user's forehead through the cushion 32. Further, the position of the center of gravity of the front support section 21 can be lowered to improve the stability of mounting the HMD 1 on the user's head. In the example depicted in FIG. 6, the greater part of the vibration motor 40 (more specifically, the motor main body 43) is positioned below a center Lw of the cushion 32 in the up-down direction (the direction along the display panel 11).

As depicted in FIG. 6, the cushion 32 has the rear surface 32*a*, which contacts the user's head. In the lower part 32*b* of the cushion 32, the rear surface 32*a* is extended obliquely rearward and upward. In a cross-sectional view of the cushion 32, the rear surface 32*a* is extended linearly in the lower part 32*b*. The upper part of the rear surface 32*a* has a curved surface 32*c* that is curved rearward. Since the cushion 32 is shaped as described above, the curved surface 32*c* contacts the user's forehead and effectively supports the HMD 1.

The vibration motor 40 is positioned lower than the curved surface 32*c*. More specifically, the upper surface 43*a* of the motor main body 43 is lower than a lower end B (the position where curvature begins) of the curved surface 32*c*. Therefore, the gravity due to the vibration motor 40 generates a moment M1 that is centered on the curved section 32*c*. The generated moment M1 acts in the direction of pushing the main body 10 toward the face of the user, and thus contributes toward bringing the user's face into close contact with the light blocking cushion 13 of the main body 10.

As depicted in FIG. 6, the cushion 32 is extended obliquely rearward and upward from its lower end 32*d*. The vibration motor 40 is positioned above the lower end 32*d* of the cushion 32. More specifically, a lower surface 43*c* of the vibration motor 40 is positioned higher than the lower end 32*d* of the cushion 32. The main frame 31 and the motor frame 37 are extended obliquely rearward and upward from their respective lower ends 31*b* and 37*d*, as is the case with the cushion 32. The vibration motor 40 is positioned above the lower ends 31*b* and 37*d* of the main frame 31 and motor frame 37. That is, the lower surface 43*c* of the vibration motor 40 is positioned higher than the lower ends 31*b* and 37*d* of the main frame 31 and motor frame 37. Since the vibration motor 40 is disposed as described above, the vibration motor 40 can be positioned closer to the rear (closer to the user's head). When the vibration motor 40 is positioned closer to the rear (closer to the user's head) as described above, the forward bulge of the housing section 34*c* accommodating the vibration motor 40 can be reduced. Further, it is possible to reduce the moment caused by the weight of the vibration motor 40 when, for example, the user moves his or her head.

In the example depicted in FIG. 6, the rear end 43*b* of the motor main body 43 is positioned rearward from the lower end 37*d* of the motor frame 37, and the rear part of the motor main body 43 is positioned above the lower part of the motor frame 37.

As depicted in FIG. 1, the mounting band 20 has the band frame 34. The front part 34*a* of the band frame 34 forms the front surface of the front support section 21. The front part

34*a* of the band frame 34 is hereinafter referred to as a frame front part. The frame front part 34*a* is curved so as to surround the user's forehead, as is the case, for example, with the main frame 31. The two extended sections 34*b* mentioned above are extended rearward from the right and left sides of the frame front part 34*a*, respectively. The extended sections 34*b* and the frame front part 34*a* may be integrally formed with resin.

The frame front part 34*a* has the housing section 34*c*, which accommodates the vibration motor 40. In the example depicted in FIG. 1, the housing section 34*c* is formed at the center of the frame front part 34*a* in the left-right direction, and bulged forward. The housing section 34*c* has a front wall section 34*d* and an upper wall section 34*e*. The front wall section 34*d* covers the front side of the vibration motor 40. The upper wall section 34*e* covers the upper side of the vibration motor 40. The front wall section 34*d* and the upper wall section 34*e* of the housing section 34*c* accommodate not only the vibration motor 40 but also the recess section 36*d* and the pillar section 36*c* of the motor frame 36.

As described above, the HMD 1 includes the main body 10 having the display panel 11, the front support section 21 connected to the upper side of the main body 10 and placed on the user's forehead, the housing section 34*c* disposed on the front support section 21, and the vibration motor 40 accommodated in the housing section 34*c*. The HMD 1 described above enables the vibration motor 40 to provide a greater sense of presence. Further, since the vibration motor 40 is accommodated in the housing section 34*c*, the vibration motor 40 can be stably driven.

Furthermore, the vibration motor 40 is disposed such that the direction of its vibration intersects the up-down direction of the display panel. More specifically, the vibration motor 40 is an eccentric motor having the rotating shaft 41, and the rotating shaft 41 is oriented in the direction along the display panel 11. Since the vibration motor 40 is disposed as described above, it is possible to inhibit the display panel 11 from shaking up and down and becoming difficult to see due to the vibration of the vibration motor 40.

Moreover, the front support section 21 has the motor frame 36, which supports the main body 10, and the vibration motor 40 is mounted on the motor frame 36. Since such a structure is adopted, it is possible to reduce the number of parts and effectively transmit the vibration of the vibration motor 40 to the main body 10.

Additionally, the recess section 37*b*, in which the rear part of the vibration motor 40 is disposed, is formed on the motor frame 37. Since such a structure is adopted, the vibration motor 40 can be disposed closer to the rear (closer to the user's head) than, for example, a structure in which the motor main body 43 is disposed on the front side of the motor frame 37 where the recess section 37*b* is not formed. When the vibration motor 40 is disposed closer to the rear (closer to the user's head) as mentioned above, it is possible to reduce the forward bulge of the housing section 34*c* for accommodating the vibration motor 40. Further, it is possible to reduce the moment caused by the weight of the vibration motor 40 when, for example, the user moves his or her head.

The vibration motor 40 is disposed in front of the lower part 32*b* of the cushion 32. Since the vibration motor 40 is disposed as described above, the vibration of the vibration motor 40 can be transmitted to the user's forehead through the cushion 32. Furthermore, the position of the center of gravity of the front support section 21 can be lowered to improve the stability of mounting the HMD 1 on the user's head.

Moreover, the cushion 32 is extended obliquely rearward and upward from its lower end 32*d*, and the vibration motor 40 is disposed above the lower end 32*d* of the cushion 32. This makes it possible to reduce the forward bulge of the housing section 34*c* accommodating the vibration motor 40. Additionally, it is possible to reduce the moment caused by the weight of the vibration motor 40 when, for example, the user moves his or her head.

Further, the upper part of the rear surface 32*a* of the cushion 32 has the curved section 32*c*. The motor main body 43 is positioned lower than the curved section 32*c*. As a result, the gravity due to the vibration motor 40 generates the moment M1, which is centered on the curved section 32*c*. The generated moment M1 acts in the direction of pushing the main body 10 toward the user's face, and thus contributes toward bringing the user's face into close contact with the light blocking cushion 13 of the main body 10.

It should be noted that the HMD 1 proposed in the present disclosure is not limited to the above-described HMD 1. Various changes may be made to the above-described HMD 1. For example, the support structure for the vibration motor 40 is not limited to the above-described examples. For instance, the HMD 1 may alternatively have only the front one of the two motor frames 36 and 37, namely, the motor frame 36. When such an alternative configuration is adopted, the motor frame 36 may be directly attached to the main frame 31. Another alternative is to provide the HMD 1 with only the rear one of the two motor frames 36 and 37, namely, the motor frame 37. In this case, the motor frame 37 may have a main body support section that supports the main body 10.

The invention claimed is:

1. A head-mounted display comprising:
- a main body that has a display panel;
- a front support section that is connected to an upper side of the main body, the front support section comprising:
  - a motor frame comprising:
    - a left column and a right column; and
    - a body support portion extending forward from lower parts of the left and right columns, connected to an upper part of the main body, and supporting the main body;
- a housing that is disposed on the front support section, the housing configured to accommodate a portion of the motor frame; and
- a vibration motor that is accommodated in the housing,
- wherein the motor frame is configured to hold the vibration motor between the left and right columns.

2. The head-mounted display according to claim 1, wherein the vibration motor is configured to vibrate in a direction intersecting an up-down direction of the display panel.

3. The head-mounted display according to claim 1, wherein the vibration motor is an eccentric motor having a rotating shaft, and the rotating shaft is oriented in a direction along the display panel.

4. The head-mounted display according to claim 1, wherein the vibration motor is mounted on the motor frame.

5. The head-mounted display of claim 4, wherein the frame comprises rigid material.

6. The head-mounted display of claim 5, wherein the rigid material comprises plastic.

7. The head-mounted display according to claim 1, further comprising:
- a recess section formed on the motor frame, wherein the recess section configured to receive a part of the vibration motor.

8. The head-mounted display of claim 7, wherein the motor frame further comprises:

a rear support wall inside the recess section; and a damping element disposed between the rear support wall of the motor frame and the vibration motor to reduce transmission of unwanted vibrations to the main body.

9. The head-mounted display of claim 8, wherein the damping element is disposed between the vibration motor and the left and right columns.

10. The head-mounted display of claim 8, wherein the damping element comprises at least one of rubber or elastomer.

11. The head-mounted display according to claim 1, wherein the front support section includes a cushion that is configured to be in contact with the forehead of the user, and the vibration motor is disposed in front of a lower part of the cushion.

12. The head-mounted display according to claim 1, wherein the front support section includes a cushion that is configured to be in contact with the forehead of the user, the cushion is extended obliquely rearward and upward from a lower end thereof, and the vibration motor is disposed above the lower end of the cushion.

13. The head-mounted display according to claim 1, wherein the front support section includes a cushion that is configured to be in contact with the forehead of the user, the cushion includes a rear surface that is placed on the forehead of the user, an upper part of the rear surface has a curved section that is curved rearward, and the main body of the vibration motor is positioned lower than the curved section.

14. The head-mounted display of claim 1, wherein the front support section further comprises:

a frame configured to be attached to a cushion at a rear side thereof; and a front frame portion forming a front surface of the front support section and having the housing forward.

15. The head-mounted display of claim 14, wherein the frame is disposed behind the vibration motor.

16. The head-mounted display of claim 1, wherein the left column and the right column are vertically oriented relative to the main body and extend upward from the body support portion.

17. The head-mounted display of claim 1, wherein the motor frame is formed as a single, unified structure integral to the front support section.

18. The head-mounted display of claim 1, wherein the housing is configured to accommodate both at least a portion of the motor frame and the entirety of the vibration motor.

* * * * *